Sept. 10, 1940.  J. SNEED  2,214,001

AUTOMATIC TRANSMISSION

Original Filed Oct. 24, 1934  5 Sheets-Sheet 1

Inventor
JOHN SNEED
By
Attorneys

Sept. 10, 1940.　　　　J. SNEED　　　　2,214,001
AUTOMATIC TRANSMISSION
Original Filed Oct. 24, 1934　　5 Sheets-Sheet 3

Inventor
JOHN SNEED
By
Attorneys

Sept. 10, 1940. J. SNEED 2,214,001
AUTOMATIC TRANSMISSION
Original Filed Oct. 24, 1934 5 Sheets-Sheet 4

Inventor
JOHN SNEED.
By Riley T. Watts
Attorneys

Sept. 10, 1940. J. SNEED 2,214,001
AUTOMATIC TRANSMISSION
Original Filed Oct. 24, 1934  5 Sheets-Sheet 5

Inventor
JOHN SNEED
By
Attorneys

Patented Sept. 10, 1940

2,214,001

UNITED STATES PATENT OFFICE 2,214,001

AUTOMATIC TRANSMISSION

John Sneed, Grosse Pointe Shores, Mich.

Application October 24, 1934, Serial No. 749,795
Renewed October 11, 1939

29 Claims. (Cl. 74—259)

This invention relates to transmission mechanism adapted, for example, for use in automotive vehicles, and more particularly relates to a transmission mechanism which is automatic in the sense that different gear ratios or gear reductions are established between the driving and driven shafts in response to the varying demands imposed upon the engine of the vehicle through a wide range of different speed and load conditions.

For the purpose of illustrating and describing my invention I will refer to it in the environment of an automobile of the types in common use today, but I expect those skilled in the art to appreciate that the application of the principles of my transmission or the transmission itself may well be suited to many other and varied uses.

It is among the objects of my invention to provide an automatic transmission, which will, without manual aid, select and establish gear ratios between the driving and driven shafts which are most conducive to the best performance of a vehicle in which the transmission is used. Another object of my invention is to provide a transmission mechanism, which, while it automatically tends to establish a great reduction between the speed of the driving shaft and the driven shaft at relatively low speeds and relatively high loads, such as starting loads, also tends to and effectively does establish a lesser gear reduction or no gear reduction between the driving and driven shafts when the torque load between such shafts falls below the point where the prime mover of the vehicle may easily and efficiently handle the load even at low speeds.

Another object of my invention is to provide a transmission mechanism in which the effect of the speed of the vehicle and the load imposed upon the prime mover of the vehicle are balanced one against the other in such a manner that the speed relationship between the driving and driven shaft be such as to permit the prime mover to function at high efficiency throughout the range of its torque characteristics while driving the vehicle.

Another object of my invention is to provide a transmission mechanism which will respond by way of changing or maintaining speed relationships between the driving and driven shaft that will permit the driver of the vehicle by mere control of the prime mover to obtain the speed relationship between the driving and driven shafts which is most conducive to the acceleration or speed or economy that the driver desires.

A further object of my invention is to provide a transmission mechanism which, in its application to an automobile, will of itself effectively, without manual assistance or control, select and establish greater speed reductions between the driving and driven shaft without loss of torque therebetween as the load on the prime mover is increased when the speed is less than a predetermined amount.

Another object of my invention is to provide a transmission that will automatically change from its maximum gear reduction to no gear reduction with relatively small increases in speed, provided the torque load is light, and will maintain a condition or no gear reduction at low speeds, while the torque load is light, but will establish of itself a lower gear ratio when the torque load is high, except that when the speed of the vehicle or the driven shaft is so fast that the prime mover cannot deliver a greater torque to the driving wheels by a lower gear ratio then the higher ratio is maintained to preserve an optimum performance of the engine.

Another object of my invention is to provide a transmission mechanism in which the change speed selection and control, at least in forward speeds is wholly contained within the transmission itself, and in which the forces transmitted act within the mechanism to participate in the selection and change of gear reductions between the driving and driven shafts.

Another object of my invention is to provide a transmission in which various gear trains are selected through frictional torque taking or load carrying means and in which the actuating pressures imposed upon the frictional means is a function of the delivered torque whereby a light pressure is exerted for transmitting a light torque or load and greater pressures are available and applied for transmitting greater torque or load.

Another object of my invention is to provide in a transmission a clutch gear composed of a plurality of friction members, part of which have gear teeth and part of which are splined to a revolvable member so that they may function as a gear when pressure is applied to the plurality of members and may be rendered inoperative by release of such pressure.

Another object of my invention is to provide a transmission in which torque and speed supply the controlling forces for selecting and establishing gear reductions between the driving and driven shafts and in which the forces responsive to torque are balanced against the forces responsive to speed through agencies which may be varied and modified so that the conditions which determine the speed changes can be predetermined for adapting my transmission to many and varied uses and conditions.

Another object of my invention is to provide a transmission in which a centrifugal governor constantly tends to select a higher gear ratio and in which within determinable limits the torque transmitted opposes the effect of the governor and also provides a reacting force against which the force of the governor is transmitted to the mechanisms which select and maintain one or more gear ratios.

Another object of my invention is to provide in a transmission a centrifugal governor which tends to move an element between inclined cam surfaces, one of which is urged toward the other according to the transmitted torque and the other of which is movable to a limited distance to establish one gear ratio, but which at the limit of its movement serves as a reaction member upon which the governor reacts to move the other to establish another gear ratio.

Other objects of my invention are to provide a transmission mechanism which is simple in construction, light in weight, compact in size, economical of manufacture, and durable and dependable in operation. Many other objects appurtenant to the foregoing have been achieved in carrying out the principles of my invention and in the design and construction thereof, which will appear and be more readily understood in connection with the following description of what I now regard as a preferred form of my invention, as illustrated in the accompanying drawings. The essential characteristics are summarized in the claims.

Referring to the drawings my transmission mechanism is shown as mounted within a main outer casing 1 suitably flanged at its forward end as at 2 for attachment to the usual clutch housing of a motor vehicle engine not shown. At the forward end, the main casing 1 is enclosed by a plate 3. At the rearward end of the transmission the main casing 1 extends inwardly as at 4 and provides a bearing support as at 5 for the rearward end of the main part of the mechanism. An extension casing 6 is appended and secured to the rearward end of the main casing and in turn carries a conventional universal joint mechanism 7 and housing 8 into which enters the propeller shaft 9.

One of the advantages of the construction of my transmission mechanism is that such parts as the main casing 1, plate 3 and the extension 6 may be advantageously and economically drawn from sheet or strip stock in suitable drawing presses as are well known to those skilled in the art.

At the forward end of the mechanism is a driving shaft 10, splined as at 11 according to common practice, for engagement with a suitable clutch mechanism, not shown for effecting releasable engagement between the transmission mechanism and the prime mover of the vehicle.

At the rearward end of the transmission and connected with the propeller shaft 9 by the universal joint 7 is the driven shaft 12, which is splined as at 13, and carries a shiftable collar 14 having internal teeth 15 for engaging one part or another of the transmission mechanism proper by virtue of which the driven shaft may be driven in either forward or reverse direction, as will hereinafter be more fully described.

Between the driving shaft 10 and the driven shaft 12 is interposed the change-speed mechanism proper, the rearward end of which is rotatably supported in the bearing 5 of the main casing 1, and the forward end of which is supported in an annular shoulder 16 formed in the forward cover plate 3; the plate 3 preferably being indented as at 17 to transmit radial load between it and the main casing 1.

Turning now, more particularly, to the change-speed mechanism, the driven shaft 12, above referred to, is hollow at its forward end as at 20 and bears within its hollow end the rearward end of a shaft 21 on suitable bearings 22. The shaft 21 extends forwardly through a bushing 23, and has at its forward end an annular concentric flange 24, an eccentrically located internal bearing hole 25, and also an external eccentric bearing projection 26, the outer periphery of which forms an eccentric bearing support which is eccentric both with relation to the axis of the shaft 21 and the axis of the internal bearing 25.

Secured to the face of the flanged end 24 of the shaft 21 and contacting the surface thereof and spaced from the bearing support 26 is a gear carrier and eccentric bearing support 30 attached by such suitable means as studs 31. The body of the gear carrier 30 in the plane 2—2 is shown, for example, in Fig. 2 to be crescent shaped in cross-section, and is preferably enlarged somewhat as at 32 and 33 to afford a somewhat greater bearing area thereupon.

The gear carrier 30 extends forwardly, and terminates in an annular portion 34, which encompasses the driving shaft 10 and bears the same in suitable bearings 35. The gear carrier 30 is in turn rotatably supported with respect to the main casing through the collar 36 in suitable bearings, such as the plain bearings 37 and 38 between which is shown another concentric element 39 yet to be described.

Thus it is seen that the gear carrier 30 is mounted concentrically and rotates concentrically with the driving and driven shafts and only partially encloses various of the gears which it carries, and permits those gears to contact with internal gears (see also Fig. 2) which surround and encompass both the gear carrier and the gears therein contained. It will further be seen that the gears within the gear carrier, while eccentrically mounted with respect to the axis of the driving and driven shafts, may be balanced with respect to their mass against the mass of the wall of the gear carrier, so that a perfectly balanced composite mass of gear carrier and gears may be rotated within the transmission. For convenient reference it will perhaps be best to consider the gear carrier 30 and the shaft 21 with the eccentric bearings carried thereby all as the gear carrier, because both the gear carrier 30 and the shaft 21 operate and function together as if in one solid piece.

Figure 4:
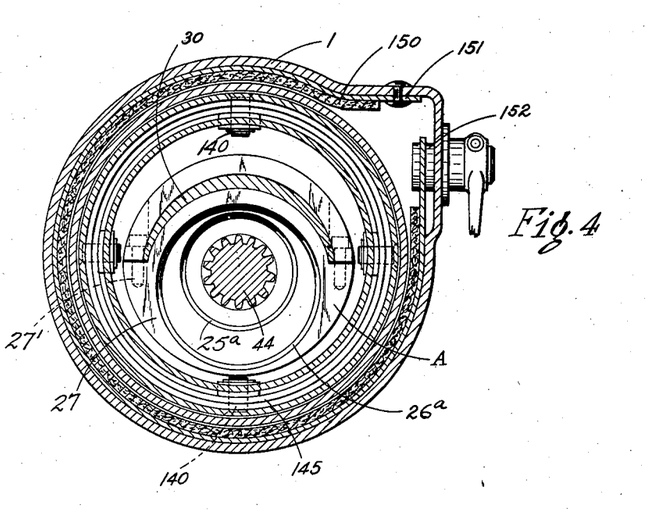
Figure 4 is a transverse section taken along the line 4—4 of Fig. 1.

The carrier 30 acting in conjunction with the shaft 21 supports and carries the eccentric bearings for the gears therein. As noted above, an internal bearing hole 25 is formed eccentrically of the axis of the shaft 21, and an external bearing part 26, eccentric both to the axis of the shaft 21 and the axis of the bearing 25, also supports another eccentric bearing. Complementary to and aligned with the axes of the eccentric bearing just described is another bearing member 27 (see also Fig. 4) which is assembled with and secured to the carrier 30 in its mid-portion by such means as cap screws 27'. In the bearing member 27 are provided a pair of internal bearing surfaces 25A which are coaxially aligned with the bearing hole 25. In the member 27 there is also provided an internal bearing surface 26a which is coaxially aligned with the external bearing part 26.

Upon the rearward end of the driving shaft 10 is formed or otherwise suitably attached an external gear 40 which meshes with the internal gear 41 of a composite internal external gear and shaft 42. This composite gear has external teeth, radially opposite the internal gear 41, at 43, and also has at the opposite end thereof a small external gear formed or secured thereon as at 44. The composite gear 42 rotates freely within the carrier 30 upon bearings 45 near its mid-portion within the bearing support 27 on the surfaces 25A, and upon bearings 46 at its rearward end disposed within the bearing hole 25 above referred to. It will thus be seen that the driving shaft 10 directly engages the composite gear 42 and tends to rotate it within the bearings 45 and 46.

The smaller external gear 44 of the composite gear 42 meshes with a separate internal-external gear 50, which latter gear is in turn eccentrically mounted with respect to the composite gear and also with respect to the axis of the gear carrier, and is supported in the bearings 51 and 52, the former of which is carried on the eccentric projection 26 at the forward end of the shaft 21, and the latter carried in the bearing support 27 on the surface 26a. When the driving shaft 10 drives the composite gear and the drive is taken through the last mentioned gears, i. e., 44 and 50, the gear 50 is rotated in the same direction as the composite gear and at a reduced speed, and the torque reaction on the eccentric bearings in both instances tends to rotate the gear carrier in the opposite direction.

From the foregoing description those skilled in the art will understand that when, by means yet to be described, the drive is effected through the driving shaft 10, composite gear 42 and internal external gear 50, and when the gear carrier is held against backward rotation, a double reduction in speed at this point will be effected between the driving shaft and the gear 50. When, however, the drive is from the driving shaft 10 through only the internal external gear 41—43 of the composite gear 42 and the gear carrier is stationary, a single reduction, i. e., a lesser reduction, is affected as between the driving shaft and the gear 41—43. It will further be understood by those skilled in the art at this point in the description of the invention that by means presently to be described, when no relative rotation is permitted between the driving shaft 10 and either the composite gear 42 or the internal external gear 50, so far as that portion of the mechanism is concerned, a direct drive may be established between the driving and driven shafts.

Thus by selection of one of the four possibilities just described, I provide in my transmission a low, intermediate, high or direct drive, and also reverse, to use the parlance commonly used in connection with automobile transmission mechanisms.

To restrain the gear and eccentric bearing carrier 30 with the shaft 21 against negative rotation when forward rotation of the driven shaft is desired, I provide an overrunning clutch 60 (see also Fig. 5) at the forward end of the carrier and disposed between the forward end of the carrier and the fixed bearing collar 36 above described. The roller clutch 60 being interposed between the collar 36 and the carrier 30 restrains the carrier against negative rotation and takes the torque reaction when the drive is in either low or intermediate speed.

When it is desired to drive the driven shaft in a reverse direction, the carrier 30 is connected to the driven shaft through the shaft 21 by means of the collar 14 and the gear 71 attached to the shaft 21. The collar 14 is splined to the driven shaft as at 13, and has internal teeth as at 15, which may be shifted into engagement with the gear 71 through a yoke 74 swung by a lever 75 which is pivoted on the axis 76 and manually controlled through suitable means such as the lever 77.

Figures 5, 6:
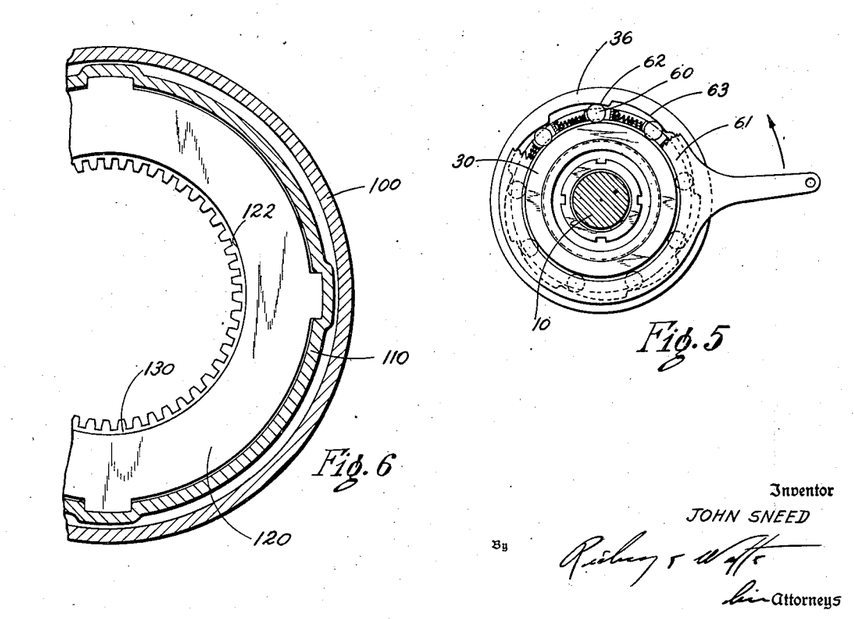
Figure 5 is a view of the overrunning clutch and release assembly.
Figure 6 is a showing of an alternative form of cup-member.

To free the roller clutch for reverse rotation of the carrier 30 I provide the mechanism shown in Fig. 5, which consists essentially of the cage 61 which has suitable openings through which the rollers may engage the converging clutch surfaces as at 62 and 63, but which, upon being rotated as indicated in Figure 5, moves the rollers out of operative relationship to the clutch surfaces. The cage 61 is manually controlled preferably through a Bowden conduit control 64 which (see Fig. 1) may be connected with the end of the lever 77 so that manual control of the lever 77 performs the double function of releasing the roller clutch 60 and effecting engagement between the collar 14 and the gear 71 attached to the carrier 30.

The foregoing description has, of course, been premised on the assumption that means are provided for selectively transmitting the torque from the gear 43 on one hand and from the gear 50 on the other, when they are revolved and driven by the driving shaft 10. The following description is directed more particularly to the means by which the torque and drive are selectively taken from these gears to effect, in the first instance, a low, intermediate and direct drive relationship between the driving and the driven shafts.

Rotatably mounted concentrically of the axis of the driving and driven shafts and rotatably supported with respect to the main casing 1 are two cup-shaped parts or drums 100 and 110, which encompass the gear carrier 30 and its associated parts. Both of the drums are preferably adapted to be formed by deep drawing operations, and can be economically manufactured for that reason, and are mounted with respect to each other to rotate together and to have a longitudinally sliding fit with respect to each other, so that there may be axial movement between them.

The outer drum or torque drum 100 is enlarged at its forward end, and is enclosed adjacent its periphery by a centrally apertured cover plate 101 rigid therewith, which extends inwardly but is at all times clear of the collar 36. The rearward end of the drum 100 extends inwardly as at 102, and is pierced or punched as at 103 to form a helical splined opening in its innermost rearward portion (see Fig. 14). The splines at this point in the outer drum 100 are inclined with respect to the axis of the drum, and lie in splined engagement with a helical gear or spline 104, which is formed in the periphery of the torque gear member 105, which member 105 is carried for free rotation within the bearing 106 in the inner and rearward end of the main casing 1. The member 105 in turn encompasses and has a bearing fit which permits limited circumferential movement between it and the inwardly adjacent annular member 111, which constitutes or is affixed to the extreme rearward end of the inner drum 110. The member 111 may preferably constitute an integral inner and rearward extension of the inner drum 110, and in any event, it functions as an integral part thereof.

The drum 110 is provided on its forward end with a fixed cover plate 115, having a forwardly extending annular flanged bearing member or portion 39. The internal surface of the portion 39 bears in the plain bearing 37 and its outer surface rotatably engages the bearing 38 in the collar 36, where it is rotatably supported as above described. End thrust may also be taken through the radial surfaces at and near the junction of the annular portion 39 with the radial part of the plate 115, through the radial portions of the plain bearing surfaces adjacent thereto, see Figure 1.

At the rearward end of the torque drum 100 in the rearward radial wall 102, are securely fixed a plurality of pins 107, which extend inwardly of the drum 100 and parallel to the axis thereof. The forward portions of the pins 107 extend through apertures 112 of the rearward radial wall of the inner drum 110, and have a close sliding fit therein, by virtue of which they are free to move axially of the inner drum 110, but permit no circumferential movement between the drums 100 and 110. In fact in the operation of the device, such torque as is imposed upon the inner drum 110 is transmitted through the pins 107 to the outer drum 100, thence through the helical spline 103—104 to the member 105 and the driven members.

At the forward end of the inner drum 110 and preferably at the periphery of the flanged rim thereof as at 110a a free close sliding fit is established with the inner surface of the outer drum 100. Thus by the sliding fit established through the pins 107 and apertures 112 at the rear of the drums and through the annular sliding contact at 110a at the forward ends thereof, the drums 100 and 110 are maintained in coaxial alignment while the outer drum is longitudinally movable with respect to the inner drum.

Thus whenever any torque is transmitted through the helical spline 103—104, i. e., between the torque gear 105 and the drums 100 and 110, there results an axially operative component of force which tends to affect relative longitudinal motion between the outer drum 100 and the inner drum 110. It will be noted that the torque gear or member 105, for all forward driving speeds, is directly connected with the driven shaft so that all the torque transmitted to or from the driven shaft by or upon the transmission mechanism is transmitted through the helical spline 103—104, and as will more fully appear, the resultant tendency to move the torque drum 100 fore or aft with respect to the drum 110 is employed according to the precepts of my invention to contribute to the operation of the mechanism, particularly in the selection and maintenance of the various gear ratios or reductions, which are from time to time established therein. It will further be noted that the torque gear or member 105 is mounted upon the member 111 in a manner which permits small circumferential motion relative thereto as may be necessary to effect all the necessary axial movement of the drum 100 with respect to the torque gear or member 105 along the splines 103—104, see particularly Figs. 1 and 14.

Figure 2:
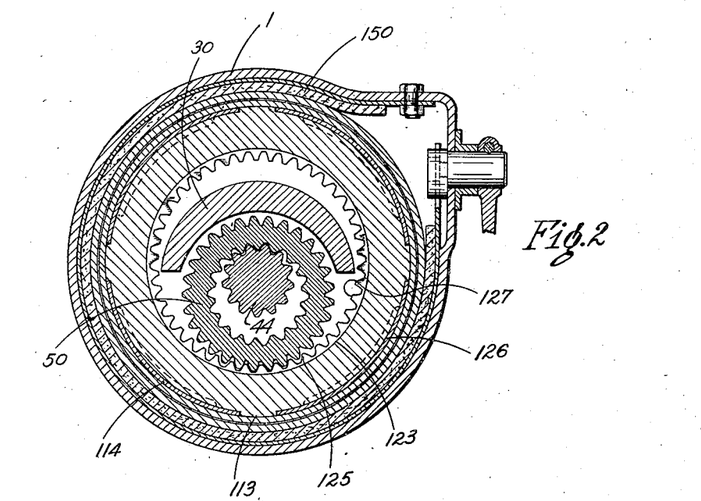
Fig. 2 is a transverse section taken along the line 2—2 of Fig. 1.

The inner drum 110 has internal splines extending throughout substantially the whole of its length as at 113 (see also Figure 2), which may be formed by the spaced attachment thereto of arcuate plates such as 114 in Figure 2, or may be deformed to provide a plurality of longitudinal depressions as shown in Figure 6. In either event the inner wall of the casing 110 has longitudinal splines in which are carried for rotation with the casing two groups of clutch plates 120 and 121 respectively. The group of plates 121 being positioned in the rearward portion of the casing 110, and the group 120 being positioned in the forward portion thereof. Each plate of these groups extends radially inward a limited distance and terminates with an inner circular periphery as at 122 and 123 respectively, so that they freely clear the teeth 43 of the composite gear 42 and also clear the external teeth of the internal external gear 50.

Referring particularly to the group of plates 121 in the rearward portion of the drum 110, I provide alternate intermediate and interspaced disks 125 (see also Fig. 2), which at their outer peripheries as at 126 have a free running fit with the smooth inner walls of the casing 110, and may revolve freely in relation thereto. Their inner peripheries are toothed as at 127 for engagement with the external teeth of the gear 50, as shown in Figure 2. The splined plates 121 and the toothed disks 125 may be stamped from sheet stock and economically manufactured, as those skilled in the art will appreciate. The material of the tooth disks is preferably of steel because of its superior strength, particularly in the tooth portions thereof, and I prefer that the alternate splined plates 121 be made of brass or other material which, with the steel plates, will have a suitable frictional relationship, when all of the plates are running in oil, as is well known in the art relating to multiple disk or plate clutches.

Thus at the rearward end of the drum 110, the groups of plates 121 and disks 125 form an element of my mechanism which constitutes both a clutch and a gear in the sense that as a gear it functions in geared relationship with the internal external gear 50, and as a clutch it functions both to disassociate the gear 50 from active relationship with the drum 110, and also functions to permit and obtain a gentle and smooth geared engagement between the gear 50 and the casing 110. When the splined plates 121 and the toothed disks 125 are squeezed together, they perform the function of a solid gear as if integrally formed or fixedly associated with the inner drum 110, so that a gear reduction and drive between the driving and driven shafts is established.

Within the forward portion of the inner drum 110 the group of splined plates 120 have the same relationship to the casing as do the plates 121 of the low clutch-gear or flexible gear 121— 125, above described. In a similar way there are arranged between each of the splined plates 120 one of the group of toothed disks 130, which fit the inner walls of the drum 110 in the same way that the toothed disks 125 fit, as described above. In the preferred form of my transmission shown herein the disks 130 may be identical with the disks 125 and the plates 120 identical with the plates 121 for the sake of economy and standardization of the parts employed. The inner toothed peripheries of the disks 130 mesh with the teeth of the gear 43, and transmit torque from that gear to the drum 110 by frictional engagement with the splined plates 120, spaced between them.

This group of plates 120 and disks 130 at the forward end of the drum 110 I will refer to as the second speed clutch-gear or flexible gear. It will thus be seen that when the first speed clutch-gear is released, and the second speed clutch-gear is engaged, that is, when there is no longitudinal pressure as between the plates 121 and disks 125, and when there is sufficient longitudinal pressure between the plates 120 and disks 130, the drive from the driving shaft 10 will be transmitted to the internal external gear 40—43 to the second speed clutch-gear, which then functions as an internal gear rigid with the drum 110, and through it to the driven shaft as above described.

Those skilled in the art will also understand that when both the low speed clutch-gear and the second speed clutch-gear are engaged so that both of them function as if integrally connected to the drum 110, a direct drive is established between the driving shaft 10 and the drum 110, and thence to the driven shaft. It will further be seen at this point that the drive between the driving and driven shafts in all forward speeds is transmitted through the pins 107 between the inner drum 110 and the outer drum 100, and the whole transmitted torque is taken through the helical spline 103—104, whereby the outer drum 100 tends to move rearwardly with respect to the inner drum 110 in response to a force proportionate to the torque transmitted depending upon the inclination of the helical spline 103—104. That is, the longitudinal force which tends to cause a relative longitudinal movement of the outer drum with respect to the inner drum is a direct function of the torque transmitted to the driven shaft.

Within the forward end of the torque drum 100 and arranged to rotate therewith is a centrifugal governor 80. The governor comprises a group of weights 81 symmetrically arranged and mounted for limited radial movement on the interior wall of the cover plate 101 and are illustrated in detail in Figures 9 to 11. The weights 81 are guided in their radial movement and restrained from rotational movement relative to the cover plate 101 by means of a tongue and groove fit thereon, each weight being provided with a groove 87 and having a free sliding fit with one of the tongues 89 secured to the cover plates. Each weight is also grooved or cut away as at 88 on the side opposite the groove 87 to permit radial movement relative to each of the cams 90 which are axially movable through the cover plate 115 of the inner drum 110 for actuation of the second speed clutch-gear. The tongues 89 are also each provided with cam surfaces 83 disposed opposite the faces of the cams 90.

Between each of the cam faces 83 and 90 are positioned rollers 82, a pair of which is carried by each of the weights 81. A pair of rollers 82 as aforesaid is disposed in a transverse slot 82a in each of the governor weights 81. Each roller receiving slot 82a is of greater width than either of the grooves 87 or 88, and the rollers 82 are longer than the width of said grooves whereby the ends of the rollers bear in the ends of each transverse slot (see Fig. 10), and are restrained against radial movement relative to the weights within the radial confines of the slot. The slots 82a are wide enough and deep enough, however, to permit the rollers to turn about their own axes and roll within limited distances transversely of the weights. Each pair of rollers 82 is limited in its transverse movement relative to each of the weights 81 by reason of the external contact of the rollers 82 with the cams 83 and 90 respectively.

Since the rollers contact each other, they have rolling contact with each other and with the cams 83 and 90 respectively whenever the weights 81 move or are moved with relation to the cam surfaces. It will be appreciated on the one hand, when the governor weights move radially outward in response to centrifugal force, that the rollers move radially outward with the weights and effect longitudinal displacement of the cams 83 and 90 with respect to each other, depending upon the inclination of the cam surfaces across which they move. It will also be appreciated that longitudinal pressure exerted, for example, between the inclined surfaces of the cams 83 and 90 upon the pairs of rollers 82 will create a radial force which urges or moves the governor weights 81 inwardly. Preferably a light coil spring 86 may encompass all the weights 81 to facilitate assembly and exert at least a nominal inward force on the weights during operation.

In response to rotation of the casing 100 the weights 81 will tend to move outwardly against the restraint imposed on the rollers by the inclined surfaces of the cams 83 and 90. The effect of this outward movement of the rollers bearing on the cams 83 is to urge the drum 100 longitudinally forward and the effect of the rollers bearing on cams 90 is to urge the cams 90 rearwardly. The cam 90 is initially free to move inwardly through the aperture of the cover plate 115 of the inner drum 110 to effect a frictional engagement of the plates and disks of the second clutch-gear with the result heretofore described. After the second clutch-gear is engaged, the cam 90 has no further rearward movement. The axial movement of the outer drum 100 depends on the reaction in the helical spline 103—104, which when the driving torque is positive tends to move the outer drum and the cams 83 rearwardly. Axial movement of the outer drum 100 also depends upon the axial component of the force resulting from the centrifugal force tending to urge the governor weights 81 radially outward and to urge the rollers 82 radially outward between the inclined surfaces of the cams 83 and 90.

Conversely, where high torque is being transmitted through the helical spline 103—104 a higher centrifugal force, i. e., higher speed must be developed in the governor 80 to effect an outward travel of the rollers 82 and any movement of the cams 90. On the other hand, when the torque transmitted through the helical spline 103—104 is small or negative, only a relatively small centrifugal force need be developed in the governor 80 to effect an extreme outward movement of the rollers 82 over the surfaces of the cams 83 and 90. In connection with the radial movement of the governor weights 81 and rollers 82 and the axial movement of the cams 83 and 90, it is to be observed that axial force transmitted through the rollers 82 to the cams 90 is always equal and opposite to the reaction of the rollers upon the cams 83. Thus the pressure on the second gear clutch plates is always a function of the torque transmitted through the helical spline 103—104. On the other hand, the torque reaction tending to move or hold the cams 83 rearwardly will not of itself effect a movement of the cams 90 unless the rollers are drawn outwardly by the governor onto the inclined surfaces of the cams 90 and this latter movement is only accomplished when the centrifugal force is great enough to overcome the tendency of the cams 83 to move or remain in a rearward position with their inclined surfaces urging or holding the rollers 82 against radially outward motion.

When the speed of rotation is sufficient to overcome the above mentioned restraining reactions and to throw the weights to the outer limit of their radial motion, the drum 100 is moved longitudinally forward as above described to the point where the pins 107 carried on the rear wall of the drum 100 extend into the drum 110 where they bear against the ring 95 therein and through the medium of this ring compress the low clutch-gear discs and plates. From the reactions just described it is to be observed that the centrifugal governor thus possesses a second office; that is to facilitate compression of the low clutch-gear discs and plates after the second clutch-gear is engaged and thus establish a direct drive through the transmission as heretofore described.

Figure 3:
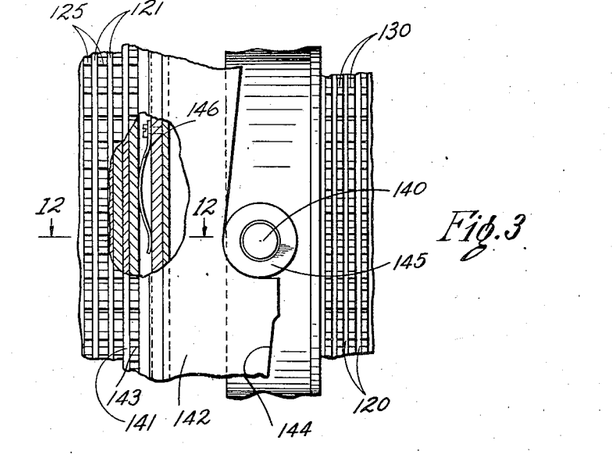
Fig. 3 is a fragmentary view aimed radially outward along the line 3—3 of Fig. 1.

The transmission of my invention is provided interiorly thereof with means to establish initially a drive between the inner drum 110 and the low gear 50. Around the inner middle periphery of the drum 110 are secured a series of pins 140 symmetrically spaced therearound and on which are rotatably mounted rollers 145. Between said pin-and-roller assembly and the low clutch-gear assembly is arranged a ring member 142 (see Figures 1 and 3) that slidably fits within the drum. Attached to the ring 142 by suitable means (see Figure 12) is an annular member 141 which with the ring 142 forms a channel which carries therein a toothed disc 143 that meshes with the gear 50. The toothed disc 143 is rotatably movable and frictionally restrained against rotational movement in the channel 142a by means of a number of flat springs 146 spaced from each other and carried in a groove formed in the ring and bearing against the face of the disc 143.

Figure 12:
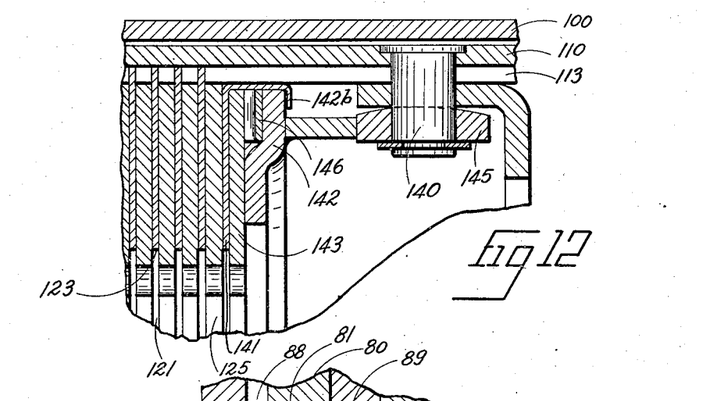
Figure 12 is a sectional view on line 12—12 of Figure 3 showing the low speed clutch-gear starter.

As illustrated in Figure 12 the means to establish the low gear drive, which may be referred to as the low gear starter, is preferably assembled as a unit. The annular member 141 is preferably joined to the ring 142 by a flange on the outer periphery thereof which extends along the adjacent wall of the drum and has a portion peened over the edge of ring 142 as at 142b. Limited longitudinal movement may be permitted between the ring 142 and the annular member 141 so that the frictional drag on the disc 143 will depend essentially on the springs 146. The assembly thus formed has a free sliding fit with the inner wall of the drum and supports the toothed disc 143 in geared engagement with the gear 50.

The ring 142 is provided on the edge adjacent the pin and roller assembly with inclined or cam portions 144 (see Figure 3) adapted to contact the rollers so that when rotation of the gear 50 is transmitted to the toothed disc 143 said disc 143 will, due to its frictional fit within the channel formed by the member 141 and the ring 142, impart a rotary movement to the ring 142. This rotary movement of ring 142 moves the cams thereon with respect to the pin and roller assembly and due to the bearing of the rollers on the cams, forces the ring 142 and member 141 attached thereto against the clutch gear disc and plate assembly. Movement of the toothed disc 143 within the channel moves the ring 142 laterally and presses the plates 121 and discs 125 against the abutment 95 which comprises an annular ring slidably disposed at the rear of the drum member 110 and bearable against the rearward radial wall thereof. It is to be observed, however, that the first toothed disc 125 immediately adjacent the member 141 of the gear starter is turning with the gear 50 and any pressure applied thereto by means of the gear starter, functions to bind the first disc 125 to the starter and thus the rotation of such disc 125 supplements the rotation of disc 143 within the gear starter to effect a movement of the starter with respect to pin and roller assembly. Further movement of the ring increases the pressure on all the discs and plates and thus the progression of movement and pressure continues until the discs and plates are fully compressed to effect the low speed clutch-gear engagement whereby the drum 110 rotates in direct response to the turning of gear 50.

The annular ring member 95 is preferably U-shaped in cross section and is arranged with the bight portion of the U against the plate and disc assembly and serves as an abutment for said assembly to react against the lateral movement of the gear starter. The pins 107 carried by the drum 100 enter the rearward wall of drum 110 adjacent the ring 95 and when the low speed gear clutch is actuated by the starter as above described the ends of the pins 107 are preferably spaced from the bight portion of the ring. The pins may be moved with respect to the drum 110, however, and are adapted to bear against and move the ring to effect the direct drive heretofore described in connection with the description of the centrifugal governor.

The spacing of the ends of the pins 107 from the bight of the ring 95 plus the free movement of the pins and ring when the low clutch-gear is not pressed rearwardly by the cam ring 142 is such that forward pressure from the pins 107 is not exerted on the low clutch-gear when it is desired to establish or maintain the second speed clutch-gear in engagement exclusively. It is to be observed that the low speed clutch-gear is thus adapted to be actuated by the initial rotation of the driving gear and also to be actuated at a different time by the longitudinal movement of outer drum resulting from helical spline and centrifugal governor reactions. The first of said low clutch-gear actuations being to establish low gear alone and the second to establish a direct drive between the driving and driven shafts.

Figures 1, 7:
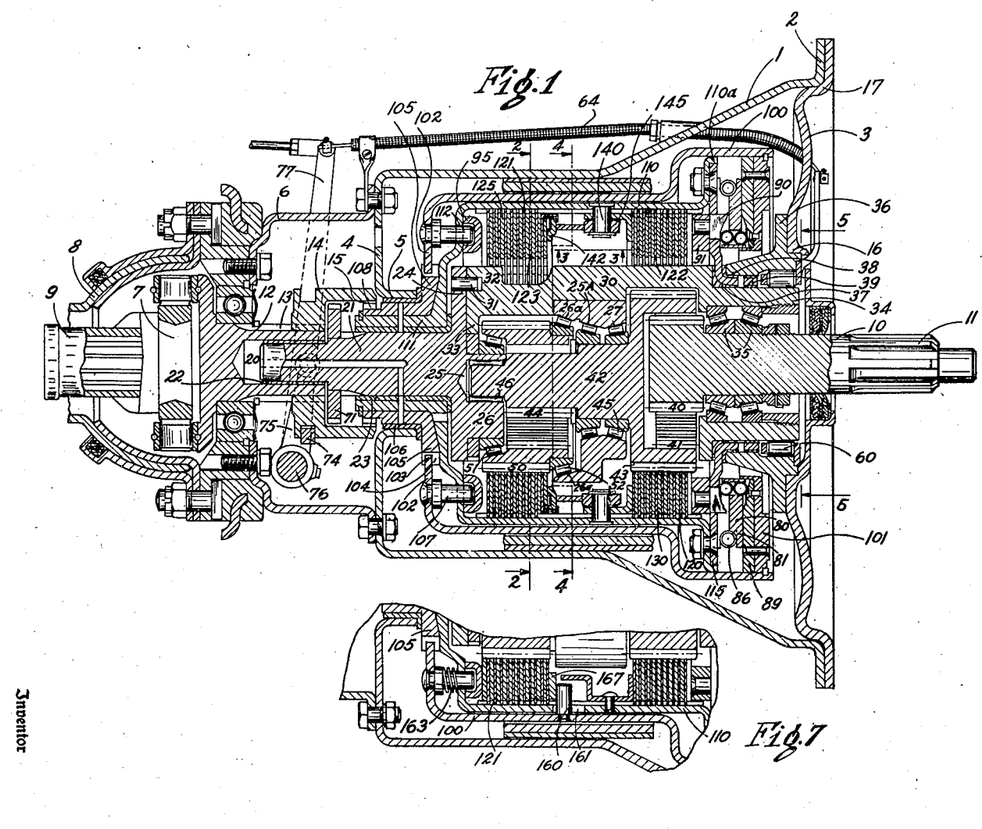
Fig. 1 is a longitudinal section of my transmission as assembled for use in an automotive vehicle, and includes a universal joint and propeller shaft at one end thereof as is common in such installations.
Figure 7 is a sectional showing of an alternative form of the low gear clutch actuating mechanism.

An alternative means for establishing the low gear drive or an alternative form of low gear starter is illustrated in Figure 7. The outer drum or torque drum 100 is provided with a plurality of pins 160 symmetrically arranged around the drum, each of which projects through a longitudinal slot in the inner drum 110 and contacts a thrust ring 167 therein. In this form of low gear starter, adjacent the pins 107 at the rear of the drum 100 and preferably located thereby, there are provided relatively light compression springs 163 arranged to urge the outer drum 100 rearwardly with respect to the inner drum 110. The thrust ring 167 which is disposed between pins 160 and the plate and disk assembly 121—125 is urged rearwardly against the plate and disk assembly through pins 160 in the first instance by the action of the springs 163 and immediately upon movement of the plates 121 by the reaction from helical spline 103—104. As described heretofore in connection with the description of the centrifugal governor and of the second speed gear engagement, the drum 100 is pulled rearwardly by increasing torque between the splines 103 thereon and the splines 104 on the torque gear. The initial drag in this form of gear starter is provided by the action of springs 163 functioning to effect a light compression of the assembly of disks and plates to initiate rotation of the drum at least with respect to the torque gear 105. As soon as the drum begins to be rotated the longitudinal movement thereof resulting from the torque reaction in the helical spline 103—104 urges the pins 160 against the thrust plate and the pressure and rotation progress as in the first form of gear starter until the disks and plates are sufficiently compressed to effect a rotation of the drums in direct response to the turning of the gear 50.

In connection with the description of both of the low clutch-gear starters above described it is to be noted that the constructions are such that the forces exerted to compress the plates and disks to effect engagement are proportional to the transmitted torque. In the gear starter of Figures 3 and 12 the cam ring can only move with respect to the pin and roller assembly 140—145 to compress the clutch-gear when the toothed disks 125—143 are moving faster than the pins and rollers and from this it follows that the cam-ring 142 gradually ceases to move laterally to effect clutch-gear compression as the clutch-gear approaches the point where it turns as a unit with the drum. In the transmission of a light torque it requires less compression of the plates and disks to accomplish the unitary turning of the clutch-gear and drum and thus the rollers do not reach as far along the cams to effect engagement of the clutch-gear as they would have to travel to transmit a higher torque. In the transmission of a high torque greater pressure must be applied to disk and plate assembly to effect an engagement of the clutch-gear and the cams move with respect to the pin and roller assembly to a higher area on the cam ring before the splined plates have reached the same rotational speed as the toothed disks.

In the alternative form of low clutch-gear starter of Figure 7 the longitudinal movement of the pin 160 on the outer drum controls the pressure on the low clutch gear assembly and it has heretofore been described how the helical spline 103—104 effects a longitudinal movement of the outer drum 100 with respect to inner drum 110 in response to torque variations. Thus the pins 160 carried on the drum 100 vary the pressure on the low clutch-gear plates in response to the longitudinal movements of the drum and a high torque pulls the drum rearwardly and establishes a greater pressure on the low speed plates and disks to transmit a higher torque. To transmit a lighter torque the pins 160 are urged rearwardly with less force and a more gentle engagement with lower pressure is established.

With varying pressures for establishing and maintaining the low clutch-gear 121—125 in engagement as above described, such engagement is maintained so far as the engagement is initiated, either by the cam ring 142 reacting upon the rollers 145 or by the pins 160 as moved by the helical spline 103—104, so long as the drive through the internal external gear 50 onto the toothed disks 125 and 143 of the low clutch gear is positive in the sense that such drive sets up a positive engaging force transmitted to the disks and plates by either of the above agencies. Disregarding for the moment the other means which are provided for causing engagement of the low clutch-gear and referring only to the gear starters above described, the engaging pressure on the low clutch gear falls to zero or becomes negative from either of these sources when the torque transmitted from the internal external gear 50 to the toothed plates of the low clutch gear falls to zero or becomes negative.

Low gear is also maintained when the speed of rotation of the drum is such that the governor weights are unable to overcome the rearward pull of the torque drum due to the torque reaction. If the rearward pull is heavy due to a high torque, a high speed of the drum is necessary to cause the governor weights to move outwardly radially, whereas a light torque permits a forward drum movement at a lower speed of rotation. Whether the torque is high or light a forward movement of drum 100 caused by the rollers 82 moving outwardly, establishes the second-speed clutch-gear and releases the first speed clutch-gear; the outward roller movement moving the cams 90 to compress the second speed clutch-gear assembly.

As the cams 90 begin to compress the second speed clutch-gear assembly the toothed disks of this assembly tend to rotate the drum faster than the drum is being rotated by the low gear assembly. As the speed of rotation of the drum is increased beyond the speed of rotation of the toothed disks of the low speed clutch-gear assembly, the pin and roller assembly 140—145 and the splined plates 121 carried by the drum advance with respect to the toothed disks 125 and 143. Since the toothed disk 143 is frictionally associated with ring 142 it tends to restrain ring 142 and the pin and rollers 140—145 move into the low areas of the cams 144 on ring 142. When the rollers reach the low cam area the ring rotates therewith and the toothed disk 143 rotates within the channel 142a in the ring at a lower rotational speed than the ring. This positioning of the ring 142 with the rollers 145 in the low cam area releases the pressure on the low speed clutch-gear assembly and effects disengagement thereof.

In the low speed clutch-gear arrangement of Figure 7 the forward movement of the drum in response to outward governor weight movement causes the pins 160 carried on the drum to move forward. As the pins 160 move forward the pressure between the plates developed by rearward drum movement is removed to permit disengagement of the low speed clutch-gear.

With either form of low speed clutch gear starter above described the disengagement of the low speed clutch-gear, when it is brought about by reason of the engagement of the second speed clutch-gear, takes place within the same small era of time and only takes place when the drive through the second speed clutch-gear and associated gear train has become so definitely established as to cause an overrunning of the drum and spline plates 121 with respect to the toothed disks 125 of the low clutch-gear. It will thus be appreciated that throughout the shift or change of speeds from the low gear reduction to the second gear reduction, that the torque is continuously being delivered to the driven shaft, and that there is no period of pause or disassociation between the driving and driven shafts, and no interruption of the transmission of the driving effort from the driving shaft to the driven shaft during the period of change. By these means provided in my transmission, I provide for a continuous driving effort through the transmission when the speed change takes place, and I also provide for a smooth shift or change of speeds through the slippage of the second speed clutch-gear, while that gear is assuming the burden of transmitting the torque which had previously been transmitted through the first speed clutch-gear. In this connection it is to be noted that as the plates of the second speed clutch-gear are being forced into engagement through the cam 90 and associated mechanism, and as increasing pressures are applied to the plates and discs thereof, proportionately increasing amounts of torque are being transmitted through the second speed gear train with the result that smaller amounts are left to be transmitted through the first speed gear train. Thus as described above, the reduction in torque transmitted through the first speed gear train is of itself a factor contributing to the disengagement thereof at and prior to the time that disengagement is affected by the actual overrunning of the drum with respect to the disks 125 of the low speed clutch gear.

Throughout this specification, and particularly the parts of it which relate to the transmission of the torque through the frictional contact between the plates and disks and the clutch-gears, I am not unmindful of the difference between the values of static and dynamic friction which will exist between the plates and disks of these mechanisms, nor should those skilled in the art be unmindful in reading this specification that certain of the statements herein contained should be read with this phenomena in mind. Thus I am aware, for example, that a lesser pressure for a given torque is required to maintain the low speed clutch-gear in engagement just prior to the instant of initial slipping than would be required to transmit the same torque after the co-efficient of friction has changed and the plates and disks have started to slip.

Figures 8, 8A, 9, 9A, 10, 11:
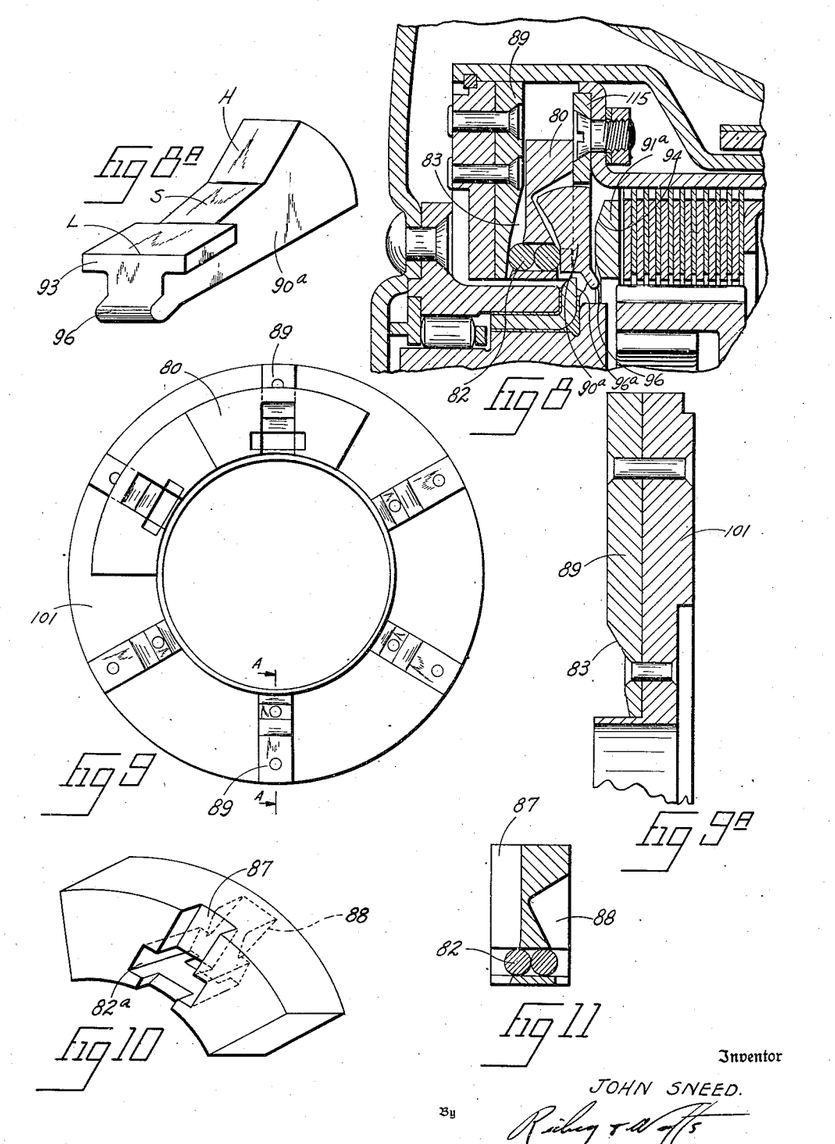
Figure 8 is a sectional showing of an alternative form of the second speed clutch gear cam arrangement.
Figure 8a is a showing of the cam element of the form of Figure 8.
Figure 9 is a view of the centrifugal governor assembly.
Figure 9a is an enlarged vertical section taken on line A—A of Figure 9.
Figure 10 is a perspective view showing the governor weight.
Figure 11 is a sectional view of the governor weight and roller assembly.

Various mechanisms may be employed to co-operate with the outward radial movement of the governor weights to compress the plates and disks of the second speed clutch-gear and Figure 8 illustrates a modified cam means to produce second gear engagement. This alternative form of cam arrangement operates similarly to that shown in Figure 1 in that the outward movement of the rollers 82 effects through the cams 90a and ring 91a a compression of the second clutch-gear, plates and disks. One of the cams 90a of this modification is illustrated in Figure 8a, and comprises a generally segmental block with an integral bar portion 93 at the lower end of the side adjacent the governor. The main body of the segmental block is proportioned to fit a rectangular slot in the cover plate 115 of the inner drum 110 in which its radial movement is limited. The cam 90a is provided on one side with three cam faces each at an angle to the other, the lower face L or bar portion face being in a vertical plane at least when the transmission is idle, the next face or intermediate face S above the face L is disposed at an angle to the face L and the top face H is disposed at a greater angle to the face L.

The angular relation of the cam faces L, S and H in their respective positions of operation may be substantially as shown in the drawings for effective operation of my transmission and may if desired be similar to the relative inclinations given in the following pages hereof with reference to a specific description of the preferred form of the cam 90 heretofore mentioned.

The bar portion 93 of the cam overhangs the side faces thereof and extends transversely beyond the aperture in the cover-plate 115 and prevents the lower portion of the cam 90a from moving through the aperture. When the rollers 82 are at their limit of inward radial movement they bear directly against the face L and because of the engagement of the overhanging ends of the bar portion 93 with the cover plate 115, are ineffective to produce cam movement. As the rollers move outwardly they contact the cam face S above the bar portion and cause the cam to tilt about the edge of the bar as an axis and compress the disks and plates of the second speed clutch-gear through the ring 91a.

The face of the ring 91a adjacent the cams 90a preferably has a major bevel adjacent the outer edge thereof as at 94 and a minor bevel at the inner edge thereof. When the cam 90a has been tilted from the position shown in Fig. 8 to an angle coincident with the major bevel on the ring 91a it will thereupon have a wide bearing area on the ring to transmit such loads or reactions as may be imposed upon it through the rollers 82 and the opposing cam 83. Adjacent the minor bevel on the inner edge of the cam ring 91a are provided inwardly extending tangs or lugs 96 formed integrally with the cams 90a (see Fig. 8a)

which during the rearward tilting of the cam are permitted to swing in the inner zone of the aperture in cover-plate 115. The lugs 96, however, come closely adjacent the body of the cover-plate as at 96a when the cams are tilted rearwardly, and when the cams are tilted forwardly the lugs 96 insure the forward tilting motion of the cams instead of a bodily forward movement thereof.

The foregoing description has dealt mainly with forward speed operation; the following is devoted to the means and mechanism for reverse drive. In connection with the description of the gear arrangement within the drums it has been stated that those skilled in the art would comprehend that torque applied to the driving shaft at a time when the drums were restrained from rotation would, by means of the eccentric arrangement of the gears, effect a reverse rotation of the driven shaft. To effect a reverse rotation of the gear carrier and a reverse rotation of the driven shaft as described it is necessary to provide means to hold the drums against rotation. In the preferred embodiment of my invention, this is accomplished through the use of a brake band 150 best shown in Figure 4. The band 150 is anchored at one end as at 151 by suitable means to the main casing 1, is arranged around the outer drum 100 and at the other end is fixed to a brake actuating lever and eccentric mounting such as 152 pivoted in the wall of the main casing. Actuation of the lever 152 in one direction tightens the band and releases it by the opposite motion. The lever may be actuated by a foot pedal or other suitable means as will be understood by those skilled in the art.

As previously described, reverse drive is delivered through gear-carrier 20 and shaft 21 when the roller clutch 60 is released. A shift of the lever 77 at the rear of the transmission adjacent the driven shaft will affect a movement of collar 14 to engage the same with the gear 71 on the shaft 21 and simultaneously through control 64 affect a release of the overrunning clutch 60. Thereupon when the brake lever 152 is actuated to tighten the band 150 about the drum 100 to prevent rotation thereof, positive rotation of the driving shaft 10 will cause reverse rotation of the carrier 30 and thus cause reverse rotation of the driven shaft through the gearing described below.

As shown in Figure 1 the gear 44 on composite gear 42 is mounted eccentric of the axes of the gear carrier 30 and driving shaft 10. The gear 44 meshes with internal-external gear 50 as illustrated in Figure 2. As viewed in Figure 2, gear 50 rotates in a counterclockwise direction (the same direction as gears 44 and 40) on an axis concentric with respect to gear 44 and eccentric with respect to the gear carrier 30 and driving shaft 10. When the brake band 150 is tightened as above described, the low clutch-gear starter functions to compress the plates and disks of the low speed clutch-gear assembly, and the low speed clutch-gear comes into operation as an internal gear fixed within the drum 110. The turning of gear 44 by the driving shaft is transmitted to gear 50, and gear 50 turning on its own axis and being unable to turn the brake restrained clutch-gear 121—125, reacts through its own axis eccentric of the gear carrier 30 and carries the entire gear carrier in a clockwise direction as viewed in Figure 2. The clockwise turning of the gear carrier through shaft 21, gear 71 and collar 14 turns the driven shaft 12 clockwise, i. e., in reverse drive.

In establishing a reverse rotation of the driven shaft, the low speed clutch-gear starter functions as described in connection with the establishment of low speed, except that since the drum 110 is stationary the function of the starter is to compress the disks and plates to prevent rotation of the toothed disks. During reverse drive, the drums 100 and 110 being held stationary, the centrifugal governor remains idle and no forces therefrom come into operation to disengage the low clutch-gear or change gear ratios in reverse.

In reverse drive the pressure on the clutch-gear 121—125 is proportional to the torque transmitted as in low speed and the reaction of this torque on the clutch-gear is transmitted through the drums to the brake band 150. A release of the brake band will permit the drums to rotate freely in response to the driving effort of the gear 50 and thus discontinue the application of torque to the gear carrier.

As shown in Fig. 1, as above described, the collar 14 may be shifted forwardly or rearwardly to engage through the internal teeth thereon at the forward end of its travel, the torque gear 105 for forward drive, and to engage the teeth on the gear 71 at the rearward end of its travel, for reverse drive. When the collar 14 is held in an intermediate position, with the teeth 15 out of engagement with either of the above mentioned gears or teeth, then of course my transmission mechanism is in what I may style a "neutral position," i. e., is mechanically disconnected as between the driving and driven shafts thereof. Suitable manual or other means attached to the lever 77, as above described, may conveniently affect this selection.

The brake band 150 has in its coaction with the drum 100 another utility, viz: that when the collar 14 is transmitting torque from the gear 105 to the driven shaft, as it does for the forward speeds referred to herein, tightening of the band 150 through the lever and eccentric mounting 152 will serve as a brake to retard the forwad motion of the vehicle. For that matter, so long as the collar 14 is engaged with the torque gear 105, tightening of the brake band 150 around the drum 100 will serve to retard or stop rotation of the driven shaft whether the movement of the vehicle is forward or otherwise.

In passing, it may be noted that it is not necessary that the vehicle be standing still when the collar 14 is shifted from an engagement with the torque gear to engagement with the gear 71 on the shaft 21 of the gear carrier to begin the initiation of a reverse drive through my transmission. For example, when the transmission is operated in the direct drive the torque gear 105 and the gear 71 will be rotating in synchronism and the collar 14 may be manually shifted from one to the other without clash, except, perhaps, when high torque is to be transmitted. In the preferred form of my transmission, as shown in Fig. 1, such a shifting of the collar 14 would also render inoperative the roller clutch 60, as above described, but it will be appreciated that in high gear no reaction is being taken through this clutch because the carrier is overrunning the clutch at the speed of the driving and driven shafts. In this situation and at this point a tightening of the band 150 about the drum 100 will retard rotation of the drum, and provided rotation of the driving shaft is maintained, will have the effect of bringing the vehicle to a gentle stop followed directly by a reverse motion of the driven shaft and reverse movement of the vehicle.

Figure 13:
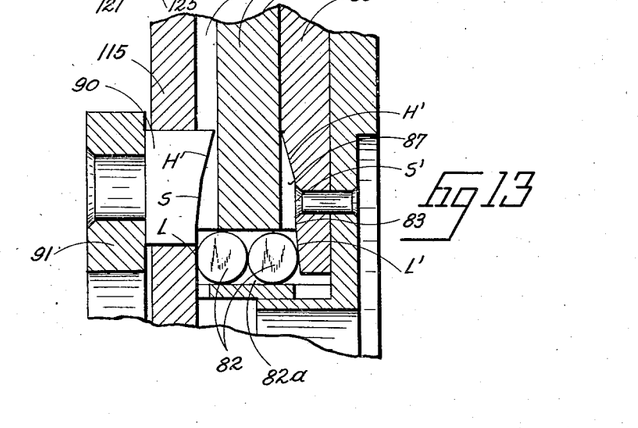
Figure 13 is a diagrammatic showing of the cam surfaces cooperating with the centrifugal governor rollers.
Figure 14:
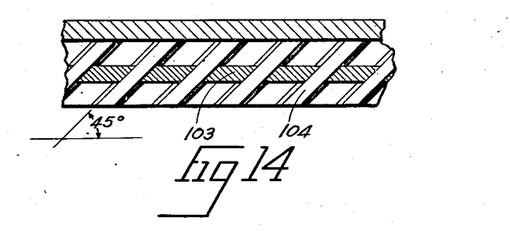
Figure 14 is a diagrammatic showing of the splined engagement between the drum and the helical torque gear.

To enable those skilled in the art to put my invention into practice more readily, I will set forth in the following paragraphs, reference being made to Figs. 13 and 14 particularly, an example of the mathematical values which I have found successfully operative for such selectably variable factors as the inclination of the cam faces and angle of the helical spline.

In a current model of motor vehicle weighing approximately 2600 pounds, with a motor developing about 151 foot pounds torque at 2300 R. P. M. and about 90 brake horsepower at 3750 R. P. M., I have satisfactorily operated a transmission constructed according to the precepts of my invention described herein. In this transmission the low speed gear ratio was 2.92 to 1 and the second speed gear ratio was 1.61 to 1. The clutch-gear disks and plates had a co-efficient of dynamic friction of about .065 and a co-efficient of static friction of about .091. The total governor weight was about four pounds and the slope of the helical spline 103—104 was about 45 degrees (see Fig. 14). The faces of the cams 90 and 83, substantially as shown in Fig. 13, were found satisfactory. The faces of cam 90 (see Fig. 13) are designated L, S, and H and opposite faces of cam 83 are respectively designated L', S' and H'. The face L of the cam 90 was in a substantially radial plane, the face S inclined about 7 degrees with respect thereto, and the face H inclined about 15 degrees with respect to said radial plane. The face L' of the cam 83 was inclined at about 6 degrees to the radial, the face S' was substantially in a radial plane and the face H' was inclined about 15 degrees with respect to said radial plane. As shown in Fig. 13, the surface L and L' terminated at about the same outward radial distance from the center of the mechanism. The other surfaces extended substantially as shown in Fig. 13.

With this particular transmission in the particular vehicle above specified, under normal driving conditions, on a smooth level road and with the engine throttle wide open, the vehicle accelerated to about 18 miles per hour in the low-speed gear and automatically shifted into second-speed gear at about that speed. Thereafter under similar conditions the acceleration was continued until the transmission automatically shifted the drive from the second-speed gear to the direct drive at about 37 miles per hour. With the same equipment, under similar driving and road conditions, the automatic gear shifts or changes in gear ratios took place at lower speeds, depending upon the extent of throttle opening. For example, with a small throttle opening under the conditions described above, the transmission would automatically establish direct drive at speeds at or less than 7 or 8 miles per hour and would maintain direct drive so long as no more than the light acceleration or constant speed was required. The transmission would automatically shift to a lower-speed gear ratio when greater acceleration was sought or when greater loads were imposed upon the motor, as, for example, by a rising grade in the road.

From the foregoing example of specific values for cam angles and the like, which have been given to more fully illustrate a specific operative structure built in accordance with the precepts of my invention, it will be understood that some or all of the values given may be varied within reasonably wide limits without departing from the teaching of this specification, and that the values given above are given for the purpose of illustration and example. To illustrate that changes in the mathematical values above given may be made without departing from the precepts of my invention, it can be readily seen for example that if the weight of the centrifugal governor were increased, greater centrifugal force would be exerted on the rollers 82 for the same speed of the driven shaft, with the result that, all other conditions above remaining constant, the shifts from low to second and second to high would take place at lower speeds than above described. Variations in the inclinations of the several cam surfaces with respect to each other, within reasonable limits, other things being equal, as above specified, would change the time of the various shifts or speed changes to meet the various conditions of use to which my transmission may be put.

Not among the least of the advantages of my invention is the ease with which such elements as the cams 90 may be changed in any given mechanism to adapt the mechanism to various conditions of use.

Having described the structure of my transmission generally, and the operation with respect to various parts thereof, the operation of the entire mechanism will now be summarized.

When the driving shaft 10 is first rotated by the prime mover the gear 40 turns the composite gear member 42 and the gear 44 at the rear thereof. The gear 44 engages internal-external gear 50, the gear 50 engages the teeth of freely turning toothed disks 125 and 143. The turning of the tooth disk 143 and the ring 142 frictionally associated therewith, then causes the ring 142 through its cam action with pins 140 to function as a first speed gear starter and compress the low gear disk and plate assembly. As soon as the low gear splined plates 121 are frictionally turned with disks 125, the drum 110 begins to be rotated by gear 50, and turn the drum 100 through pins 107, the axis of the gear 50 being held by the gear carrier through the roller clutch 60. The drum 100 through the helical spline 103—106 at the rear thereof turns the helically splined member 105, and thus through collar 14 turns the driven shaft 12 in the first forward speed. The longitudinal component of force through the helical spline urges the drum 100 rearwardly and tends to force or hold the rollers 82 of the centrifugal governor in their innermost radial position out of effective contact with the first inclined surface of the cam 90.

As the speed of the drum and driven shaft is increased, greater centrifugal force is developed in the governor weights 81 which tends to draw the rollers 82 radially outward against the tendency of the transmitted torque to hold them radially inward. When the point of balance as between these opposed forces is passed, whether by increase in centrifugal force or decrease in transmitted torque, or by a combination of such conditions, and the centrifugal force in the governor is great enough to move the rollers 82 outwardly onto the inclined surfaces of the cams 90 against the resistance offered by the cam 83, the cam 90 is then forced rearwardly to initiate the engagement of the second-speed clutch-gear.

Thus the outward movement of the weights will be transmitted to the cam 90 and ring 91, and cause the same to compress the toothed disks and plates of the second speed clutch-gear assembly. At this point in the operation it is to be noted that as the pressure is being applied to effect an engagement of the second speed clutch-gear the tendency is for the drum rotation speed to be increased with respect to the toothed disks of the low speed clutch-gear and the torque being transmitted through the low speed clutch-gear is decreasing co-incidental with a decrease in pressure on the low clutch-gear plate and disc assembly. This simultaneous increase of second gear transmitted torque and decrease of first gear transmitted torque effects a smooth gradual disengagement of the low clutch-gear, and a smooth engagement of the second speed clutch-gear. The toothed disks of the second speed assembly, before the pressure from the cam 90 is affected, are turning at a greater speed than the splined plates, but due to the friction therebetween as the cam pressure is applied, the toothed disks gradually impart their rotational speed to the splined plates until both disks and plates travel at the same rotational speed, and the drums are turned by means of the second speed clutch-gear assembly exclusively. The drums in turn drive the helical torque gear 105, and thus the driven shaft 12, as above described.

As described in detail in connection with the description of the low clutch-gear, the low clutch-gear is disengaged when the rotational speed of the drum exceeds the rotational speed of the toothed disks driven by gear 50. The effect of the difference in rotational speeds is to move the drum carried pin and roller assembly 140—145 with respect to the gear starter ring 142 into the low area of the cams 144 thereon.

In the normal course of operation of the transmission of the invention, as the speed of rotation of the driven shaft and drums is increased, the centrifugal force of the governor weights is increased thereby. If the transmitted torque does not increase sufficiently during the same period to resist outward movement of the rollers 82 along the inclined surfaces of the cams 83 and 90, the governor weights will move outwardly on their radial paths.

When cams 90 have reached the limit of their rearward movement for a given set of conditions, outward movement of the governor and rollers will cause a longitudinal forward movement of the outer drum 100 with respect to the inner drum 110 by the reaction between the cams 83, rollers 82 and cams 90. Such forward movement of drum 100 and pins 107 carried thereby effects a compression of the low gear disk and plate assembly 121—125. Thus both the low speed clutch-gear and second speed clutch-gear are both being compressed at the same time. As the pressure is being applied to the low speed clutch-gear by pins 107, the splined plates 121 tend to turn the toothed disks 125 therewith. The drum is turning at this time in response to the second speed clutch-gear engagement and due to the difference in gear ratios the drum tends to turn gear 50 through the low speed clutch-gear at a greater rotational speed than the gear 50 is being turned by the pinion 44 on composite gear 42, with the result that the axis of the gear 50 is bodily rotated, carrying with it the whole gear carrier 30 until there is no relative turning motion between the gear 50 and the composite gear 42 or any other gears in the system. As gear carrier 30 rotates on its own axis it carries composite gear 42 and gear 43 therewith. The effect of advancing the axis of gear 43 around the drum in the same rotational direction that the gear 43 is rotating the drum, reduces the relative movement between the gear 43 and the drum. The pins 107 by compressing the low speed clutch-gear assembly thus initiate a series of events which culminate in the rotation of the gear carrier at the speed of the driving and driven shafts. When gears 43 and 50 cease to rotate about their own axes and rotate bodily with the gear carrier 30, the entire assembly of gears, gear carrier 30 and drums 100 and 110 rotate as an integral mass about the axis of the driving and driven shafts and the transmission of the invention is in direct drive.

While my transmission in its preferred form is in direct drive the squeezing pressure on the clutch-gears is equal to the longitudinally exerted compressive force in the rollers 82 of the centrifugal governor. In the preferred form of my invention this pressure is always equal to the rearwardly acting pressure of the cams 83 which is actuated by the helical spline 103—104, and is always a function of the transmitted torque. Regardless of the radial position to which the rollers 82 are drawn by the governor, in the preferred form of my invention the transmitted torque always measures the squeezing force exerted on the clutch-gear plates through the rollers 82, whether directly through the cams 90 or through the pins 107, or both. This force, however, cannot be effectively exerted to compress the clutch gears without the cooperation of the centrifugal governor because the governor must supply the force to hold the rollers in a given radial position to maintain them radially on the inclined cam surfaces along which a positive torque always seeks to force them inwardly. By this coaction and interdependence upon the speed responsive governor and the torque responsive cams 83 with the cover plate, drum, helical spline, etc., the selection, maintenance and disengagement of direct drive and second speed is directly affected.

When my transmission is in direct drive and when the speed of the vehicle is reduced, while the torque is high enough, the longitudinal squeeze on the rollers 82 will overcome the centrifugal force tending to hold them in their outmost zone of operation and force them inwardly, permitting the cams 83, drum 110 and pins 107 to move rearwardly and release the low clutch-gear. If at that point the torque load is not too great, then the transmission will function in second gear. If, however, the torque load in such a circumstance is so great that the centrifugal force of the governor will not hold the rollers 82 along the middle zone of the cams 90 and 83, then the rollers may be forced to their innermost zone of operation, thereby relieving the second speed clutch-gear and permitting the first speed clutch-gear to be engaged by the gear starter mechanism 142 and pin and roller assembly 140—145. Such release of second speed clutch gear as thus described will also be accompanied by rearward movement of pins 160 in the alternative form of low speed clutch-gear starter shown in Figure 7 to compress the plates and disks 121—125 of the low speed clutch gear assembly, and establish a low gear drive in a similar manner.

The operation in reverse, having been heretofore fully described, will not be repeated in this summary.

While the foregoing description and specification has illustrated and described a preferred form of an embodiment of my invention along with certain modified and alternative constructions for certain parts thereof, it is to be understood that I do not thereby propose to limit myself to the specific form or details of construction herein illustrated and described, or otherwise, or in any manner other than by the claims appended hereto when construed with the reasonable range of equivalents to which they may be entitled in this art.

I claim:

1. In a transmission having driving and driven shafts and reduction gearing disposed therebetween, a pair of friction clutches selectively engageable to connect said shafts through said gearing, a drum supporting said clutches and splined to parts thereof, a second drum encompassing the first drum and having relative movement with respect thereto, means within the first drum for resisting movement of said clutch parts, and means for compressing said clutches extending through the walls of said first drum and movable by said second drum.

2. In a transmission having driving and driven shafts and internal external reduction gearing disposed therebetween, a clutch-gear having internal teeth operatively connected with said gearing, a rotatable drum supporting said clutch-gear, a second rotatable drum coaxially disposed with said first drum, means for restraining said drums against relative circumferential movement while permitting longitudinal movement therebetween, means for effecting longitudinal movement between said drums responsive to the torque transmitted between said shafts, and means associated with said drums bearing upon said clutch-gear for engaging the same in response to relative longitudinal movement therebetween.

3. In a transmission having a driving shaft and a driven shaft, and change speed reduction gearing directly connected with the driving shaft, and selectively connected with the driven shaft, a plurality of internal clutch-gears associated with the driven shaft and encompassing said gearing, a rotatable drum for carrying said clutch-gears, a second drum non-rotatably associated with said first drum and longitudinally movable with respect thereto, means for transmitting torque from said first drum to said second drum to affect longitudinal movement therebetween, a centrifugal governor operatively disposed with relation to said drums to move the same with respect to each other, and means operatively connected with said drums and said governor to selectively engage and disengage said gear clutches.

4. In a transmission having driving and driven shafts and reduction gearing disposed therebetween including internal gears adapted to be selectively connected with one of said shafts, friction clutch means operatively associated with said internal gears for releasably and selectively connecting them with one of said shafts, a pair of coaxially arranged drums circumferentially fixed and longitudinally movable with respect to each other, the inner drum rotatably supporting said gears and slidably carrying at least parts of said clutches on its circumferential wall, and both drums having adjacent radial walls at both ends movable respectively toward each other at one end when moved away from each other at the other end, fixed abutments carried by said inner drum for resisting movement of said clutch parts, and means acting through the radial walls of said inner drum and movable by the radial walls of said outer drum and engaging said clutches to affect engagement and release thereof.

5. In a transmission having a driving shaft and a driven shaft and change speed gearing interposed therebetween, a pair of rotatable members secured against relatively circumferential movement and arranged to have relative longitudinal movement, oppositely disposed cam means respectively carried by said members, a centrifugal governor arranged to act on said cam means, means disposed between said cam means and connected with said governor, means responsive to transmitted torque for urging said cam means toward and away from each other, and means actuated by said cam means for selectively connecting said driving and driven shafts through said gearing.

6. In a transmission having driving and driven shafts and change speed gearing selectively disposed therebetween, means responsive to longitudinally exerted pressures for selectively connecting said shafts through said gearing, longitudinally movable cams oppositely disposed and operatively connected with said means, means for moving one of said cams responsive to the torque transmitted from one of said shafts to the other, a pair of rollers positioned between said cams and radially movable across the faces thereof, a speed responsive centrifugal governor engaging said rollers and tending to move the same across said cams to vary the spacing therebetween, the faces of said cams being inclined to resist outward radial movement of said rollers whereby greater centrifugal force is required to move said cams relative to each other when greater torque is transmitted from the driving to the driven shaft.

7. A transmission comprising, driving and driven shafts and reduction gearing therebetween, a slippable clutch to couple said shafts through said gearing, means associated with said clutch to effect clutch engagement during a gear reduction and a second means associated with said clutch to effect clutch engagement for direct drive.

8. In a transmission having driving and driven shafts and gearing selectively disposed therebetween, a gear carrier and eccentric bearing support coaxially aligned with said shafts and eccentrically and rotatably supporting part of said gearing, means for selectively connecting said carrier and support with the driven shaft, a drum coaxially disposed with respect to said shafts and said carrier and support, gear means disposed within said drum and selectively engageable therewith and with said gearing, means for selectivitely restraining said carrier from negative rotation and permitting free forward rotation thereof, means for selectively restraining movement between said gear means and said drum, and means for selectively connecting said driven shaft with said drum.

9. In a transmission having driving and driven shafts, and change speed gearing disposed therebetween, means for selectively connecting said shafts through said gearing to selectively establish at least two forward speeds including a rotatable torque transmitting member having a helical spline connection with the driven shaft during each of said forward speed drives and a centrifugal governor rotated by said member, said member coacting with said governor and modifying the forces exerted by it in proportionate relation to the torque transmitted.

10. In a transmission having driving and driven shafts and selective change speed gearing therebetween, the combination of slippable clutch means selectively connecting said shafts through said gearing to produce different speed ratios between said shafts, and means to produce clutch engaging forces proportionate to the torque transmitted by one of said shafts comprising a torque transmitting member having a helical spline connection with the driven shaft and a centrifugal governor operatively connected with said torque transmitting member and said clutch means, said torque member adding to the clutch engaging forces exerted by said governor upon said clutch means up to the point where a different speed ratio is selected through said gearing.

11. A transmission comprising a driving shaft and a driven shaft, and reduction gearing disposed therebetween, a pair of concentric drums, one disposed within the other, mounted co-axially of said shafts, the outer drum of said pair having a spline connection with said driven shaft and being movable longitudinally through said spline connection with respect to the inner drum of said pair, clutch means operatively connected to said gearing carried by said inner drum and clutch actuating means projecting through the walls of said inner drum arranged to be moved by said outer drum.

12. In a transmission having driving and driven shafts and reduction gearing disposed therebetween, a multiple disk clutch gear mounted to move bodily with respect to said shafts and gearing having one set of disks operatively connected with one of said shafts and another set of disks operatively connected with the other of said shafts, means disposed on opposite sides of said clutch-gear for holding said gear against bodily lateral movement when engaging pressures are exerted upon either of the opposite sides, and means disposed on opposite sides of said clutch-gear for selectively exerting engaging pressures thereupon.

13. A transmission comprising a driving shaft, a driven shaft, a pair of concentric drums, one disposed within the other, mounted co-axially of said shafts, a splined connection between the outer drum and said driven shaft, the outer drum of said pair movable longitudinally through said splined connection with respect to the inner drum, means carried by said drums to prevent rotation of said drums with respect to each other, means within the inner drum of said pair operatively connected thereto tending to rotate said drums, means associated with said outer drum to restrain the rotation thereof, and means for disconnecting said outer drum from the driven shaft and for connecting said second named means to the driven shaft when the outer drum is held against rotation.

14. An automatic transmission comprising a driving shaft and a driven shaft in alignment with each other, change speed gearing arranged between said shafts and a pair of telescopically arranged drums surrounding portions of said shafts and said gearing, one of said drums having a helical connection with said driven shaft and arranged to be moved longitudinally with respect to the other drum in response to torque variations, a speed responsive means carried by said drums moving in response to increases in speed in a direction tending to oppose the movement occasioned by torque increases through said torque responsive helical connection, said speed responsive means and said helical connection co-operating to establish and maintain a speed change gearing relationship determined by the speed and load conditions in the transmission.

15. An automatic transmission comprising a driving shaft and a driven shaft rotatably mounted with respect to a gear carrier member, gears mounted on said gear carrier, a plurality of clutch gears surrounding said gears and gear carrier, said clutch gears having a splined relationship with a drum surrounding said gear carrier, torque responsive means and a speed responsive means operatively associated with said drum to effect compression of said clutch gears to establish through said clutch gears a geared relationship between said driving and driven shafts.

16. In an automatic transmission, a driving shaft and a driven shaft, a gear carrier, a pair of telescopically arranged drums co-axially mounted with respect to said driving and driven shafts, the inner drum of said pair provided with a series of alternate driving and driven discs, said driven discs splined to said inner drum and said driving discs notched to provide gear teeth arranged to effect a geared relationship between said driving shaft and said inner drum, torque responsive means and speed responsive means carried by said drums, said speed responsive means comprising a series of weights arranged to move in response to increases in speed to effect a compression of said discs and said torque responsive means acting in opposition to said speed responsive means tending to decrease the compression of said discs.

17. A transmission having a driving shaft, a driven shaft, change speed gearing arranged between said shafts, one of the gears of said change speed gearing comprising a clutch gear having alternate driving and driven discs, the driving discs being notched at their inner periphery and the driven discs being notched at their outer periphery, means engaging the said driven discs to transmit their movement to the driven shaft, said means including a speed responsive device tending to increase the engaging pressure on said clutch gear and a torque responsive device tending to modify the engaging pressure on said clutch gear.

18. A transmission having a driving shaft, a driven shaft, change speed gearing arranged between said shafts, one of the gears of said change speed gearing comprising a clutch gear having alternate driving and driven discs, the driving discs being notched at their inner periphery and the driven discs being notched at their outer periphery, means engaging the said driven discs to transmit their movement to the driven shaft, said means including a speed responsive device tending to increase the engaging pressure on said clutch gear comprising a plurality of cams operatively connected to said clutch gear engaged by a like plurality of radially movable weights, said cams being moved by the outward travel of said weights to increase the engaging pressure between said driving and driven discs.

19. A transmission having a driving shaft, a driven shaft, change speed gearing arranged between said shafts, one of the gears of said change speed gearing comprising a clutch gear having alternate driving and driven discs adapted to be compressed into frictional engagement to establish and maintain a low speed gear ratio between said driving and driven shaft, another of the gears of said change speed gearing comprising a clutch gear adapted to be compressed into frictional engagement to establish a second speed gear ratio between said driving and driven shaft, a drum surrounding both of said clutch gears, said drum provided with a torque responsive means and a speed responsive means, said speed responsive means acting on said drum and clutch gears in response to increases in speed tending to effect a compression of said clutch gears and said torque responsive means acting on said clutch gears tending to effect a release of clutch gear engagement.

20. In a transmission, a driving shaft, a driven shaft, change speed gearing arranged therebetween, said change speed gearing including a clutch gear adapted upon compression thereof to establish a low speed gear ratio between said driving and driven shaft, a second clutch gear adapted upon compression thereof to disengage said first clutch gear and establish a higher speed gear ratio between said driving and driven shafts, a drum surrounding both of said clutch gears mounted to move axially with respect thereto, a speed responsive means and a torque responsive means operatively associated with said drum to effect axial movement thereof and means operatively connecting said drum and said clutch gears to selectively effect engagement of either of said clutch gears and effect engagement of both of said clutch gears to establish a direct drive between said driving and driven shafts.

21. A transmission including a driving shaft, a driven shaft and change speed gearing arranged therebetween, a drum rotatably mounted to encompass said change speed gearing, said drum fixed against axial movement with respect to said gearing, a second drum arranged about said first drum and fixed against axial rotation with respect to said first drum, said second drum mounted for limited axial movement with respect to said first drum and having a connection with said driven shaft effective to tend to move said second drum with respect to the first in response to changes in torque, a speed responsive device acting upon both of said drums tending to move said second drum with respect to the first drum in response to changes in speed, and means carried by said drums engaging said change speed gearing to effect gear ratio changes in response to movements of said second drum.

22. In a transmission, a driving shaft, a driven shaft, speed change gears interposed between said shafts, one of said gears comprising a clutch gear having driving and driven discs, speed responsive means arranged to effect a frictional engagement of said discs comprising a plurality of spaced cams operatively associated with said clutch gear and a like plurality of weights movable radially outward with respect to said clutch gear into engagement with said cams in response to increases in speed in said driving and driven shafts.

23. In a transmission, a driving shaft, a driven shaft, speed change gears interposed between said shafts, one of said gears comprising a clutch gear having driving and driven discs, speed responsive means arranged to effect a frictional engagement of said discs comprising a plurality of spaced cams operatively associated with said clutch gear, each of said cams having a pair of surfaces inclined with respect to each other, a like plurality of weights movable radially outward with respect to said clutch gear into successive engagement with said pair of surfaces on said cams in response to increases in speed in said driving and driven shafts.

24. In a transmission, the combination of driving and driven shafts with gearing therebetween, a friction clutch also interposed between said shafts in the path of torque through said gearing and engageable by axial pressure, a radially acting speed responsive means, axially acting torque responsive means, a part axially fixed with respect to said clutch, a cam pivotally supported on said part and having pivotal contact with said clutch at a point spaced from said fixed part and having an inclined radial surface opposite said clutch and being pivotally movable in an axial plane with respect to said fixed part, and means having a movable antifriction contact with said cam surface engaged by both said first named means.

25. The transmission described in claim 7 in which said slippable clutch comprises toothed clutch plates in geared engagement with said gearing.

26. The transmission described in claim 7 in which at least one of the means associated with said clutch is responsive to the amount of torque transmitted.

27. The transmission described in claim 7 having means for establishing an intermediate speed ratio, said first named means automatically releasing said clutch as said intermediate ratio is established.

28. In a transmission, a driving shaft, a driven shaft, change speed gears interposed between said shafts, one of said gears comprising a clutch gear having disks in geared engagement with said gearing and alternate disks frictionally engageable therewith, means engaging said alternate disks to transmit their movement to the driven shaft, and means coacting with said last named means for transmitting forces to said clutch gear to effect the engaging pressure therein comprising members coacting with each other and adapted to be moved with at least one component of their movement directed to develop clutch engaging pressures in response to movements therebetween induced by the torque transmitted to said driven shaft.

29. In a transmission a driving shaft, a driven shaft, gear trains of different ratios interposed therebetween, said trains each including a clutch gear having disks in geared engagement with its associated train and having disks connected with one of said shafts, and means for selectively exerting clutch gear engaging forces upon said clutch gears to selectively direct the torque transmitted from the driving to the driven shaft through said trains.

JOHN SNEED.